United States Patent
Novellas et al.

(10) Patent No.: US 11,986,855 B2
(45) Date of Patent: *May 21, 2024

(54) PROCESS AND APPARATUS FOR EXTRUDING BANDS OF MATERIAL ONTO A SUBSTRATE

(71) Applicant: Zephyros, Inc., Romeo, MI (US)

(72) Inventors: Xabier Novellas, Molsheim (FR); Francois Crouzet, Molsheim (FR); Christophe Epp, Molsheim (FR)

(73) Assignee: Zephyros, Inc., Romeo, MI (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/533,636

(22) Filed: Nov. 23, 2021

(65) Prior Publication Data
US 2022/0118477 A1    Apr. 21, 2022

Related U.S. Application Data

(63) Continuation of application No. 16/337,101, filed as application No. PCT/IB2014/058173 on Jan. 10, 2014, now Pat. No. 11,207,710.

(30) Foreign Application Priority Data

Jan. 11, 2013 (GB) .................................... 1300483

(51) Int. Cl.
*B05D 3/04* (2006.01)
*B05C 5/00* (2006.01)
(Continued)

(52) U.S. Cl.
CPC .............. *B05D 3/042* (2013.01); *B05C 5/001* (2013.01); *B29C 48/05* (2019.02); *B29C 48/154* (2019.02);
(Continued)

(58) Field of Classification Search
CPC ........ B05D 3/042; B05D 3/04; B05D 3/0406; B05D 1/265; B05C 5/001; B05C 5/0216;
(Continued)

(56) References Cited

U.S. PATENT DOCUMENTS 3,953,626 A      4/1976  Suzuki et al.
4,970,985 A *  11/1990  Slautterback ......... B05B 7/0861
                                                                      239/296

(Continued)

FOREIGN PATENT DOCUMENTS

EP           0686435 A1    12/1995
JP           H0466158 A     3/1992
(Continued)

OTHER PUBLICATIONS

PCT Search Report & Written Opinion dated May 27, 2014, International Application No. PCT/IB2014/058173.
(Continued)

*Primary Examiner* — John L Goff, II
(74) *Attorney, Agent, or Firm* — The Dobrusin Law Firm, P.C.

(57) ABSTRACT

A extrusion process and apparatus for the deposition of precise, usually small amounts of extrudate (4) for adhesion to a substrate (1) comprising an extruder (2) positioned close to the substrate (1) and a jet of hot gas (6) directed onto the extrudate (1) between the extruder (2) and the substrate (1) in order to retain the adhesive properties between the extrudate (4) and the substrate (1).

20 Claims, 1 Drawing Sheet

(51) Int. Cl.
*B29C 48/05* (2019.01)
*B29C 48/154* (2019.01)
*B29C 48/92* (2019.01)
*B05C 5/02* (2006.01)
*B29C 48/02* (2019.01)
*B29C 48/14* (2019.01)
*B29C 48/88* (2019.01)
*B29C 48/91* (2019.01)
*B29C 65/48* (2006.01)

(52) U.S. Cl.
CPC ............ *B29C 48/92* (2019.02); *B05C 5/0216* (2013.01); *B29C 48/02* (2019.02); *B29C 48/1472* (2019.02); *B29C 48/91* (2019.02); *B29C 48/917* (2019.02); *B29C 65/48* (2013.01); *B29C 2948/92476* (2019.02); *B29C 2948/92514* (2019.02); *B29C 2948/92704* (2019.02)

(58) Field of Classification Search
CPC ......... B05C 5/00; B05C 5/002; B05C 5/0208; B05C 5/0212; B05C 11/06; B29C 48/154; B29C 48/92; B29C 48/05; B29C 48/1472; B29C 48/917; B29C 48/02; B29C 48/91; B29C 48/3001; B29C 2948/92704; B29C 2948/92476; B29C 2948/92514; B29C 65/48; B29C 67/00
See application file for complete search history.

(56) References Cited

U.S. PATENT DOCUMENTS

| | | |
|---|---|---|
| 5,358,397 A | 10/1994 | Ligon |
| 5,409,733 A | 4/1995 | Boger |
| 5,851,853 A | 12/1998 | Lee |
| 6,533,866 B1 | 3/2003 | Franz |
| 11,207,710 B2* | 12/2021 | Novellas ................ B29C 48/05 |
| 2003/0140671 A1 | 7/2003 | Lande |
| 2008/0289758 A1 | 11/2008 | Krabbenborg |
| 2010/0117254 A1* | 5/2010 | Fork ....................... B29C 48/92 |
| | | 264/129 |
| 2010/0175759 A1 | 7/2010 | Ikushima |

FOREIGN PATENT DOCUMENTS

| | | |
|---|---|---|
| JP | H05253526 A | 10/1993 |
| WO | 2004/039505 A1 | 5/2004 |
| WO | 2012/104071 A2 | 9/2012 |

OTHER PUBLICATIONS

India First Examination Report dated Jul. 22, 2019, India Application No. 2530/KOLNP/2015.

* cited by examiner

PROCESS AND APPARATUS FOR EXTRUDING BANDS OF MATERIAL ONTO A SUBSTRATE

The present invention relates to improvements in or relating to methods and apparatus for extrusion. In particular the invention relates to the extrusion of relatively low melting temperature materials and especially to materials that are thermally activatable such as thermohardenable and/or foamable at temperatures above the extrusion temperature. The invention is further concerned with extrusion techniques that involve the precise and intermittent extrusion of materials often as small amounts such as patterns or thin strips of material where a controlled flow of the extrudate is essential. The invention is particularly concerned with the extrusion of material onto a series of substrates such as in an assembly line and is designed to compensate for variations in the dimensions of the different substrates which occur despite the aim of making them identical and which can lead to undesirable cooling of the extrudate reducing its ability to bond to the substrates.

Although not limited to such the invention is particularly concerned with the robotic application of structural adhesives to a series of substrates such as components such as for example, in the mass production of automobile components such as panels. In such an automated production a series of theoretically identical parts are produced and the parts, carrying the adhesive are then employed in the automobile assembly process. In such a process it may be required to apply the adhesive in a particular pattern or array on the component and in doing so it is necessary to stop extrusion once the desired pattern or array of adhesive has been provided on one component, remove the component carrying the adhesive, replace the component with another component and then repeat the cycle. This process is repeated until the required number of component substrates carrying the pattern or array of adhesive have been produced. In certain applications a discontinuous pattern or array may be required and in this instance it may be required to perform intermittent extrusion on a single component. Typical extrudates can be of a thickness of 0.25 mm to 1 cm and in order to have uninterrupted production despite variations in the dimension of the substrates it is necessary to mount the extrusion die some distance from the surface of the substrates.

A problem with such processes is that it is difficult to maintain the size and shape of the extrudate and to retain the position of the extrudate on the substrate once it has been deposited thereon. Accordingly it has been necessary to use larger quantities of material in order to ensure the presence of sufficient material to perform the desired function. The present invention is therefore concerned with the extrusion of material onto substrates with fine tolerance which provides an economically attractive process.

Additionally in some processes structural bonding adhesive must be applied at a precise position and with precise dimensions on the edge of panels to enable the formation of bonds between the panel and other structures. The location and the amount of adhesive applied on the substrate has therefore to be precise. However although the substrates as produced are intended to be identical the dimensions of the substrates can vary by a few millimetres and this variation may interfere with the deposition of the adhesive and may influence the amount of adhesive applied. Additionally it requires the provision of a gap between the extruder and the substrate which can result in undesirable cooling of the extrudate before it reaches the substrate. In the case of robotic application the result of all these variations and the need for the repeatability of the robotic action requires a system for correcting/adjusting the position of the deposition of the adhesive on the substrate.

It is known to extrude materials onto substrates. For example United States Patent Application publication 2006/0127584 is concerned with the robotic application of activatable adhesive materials to moving substrates such as automotive panels and proposes that a jet of warm air may be directed onto the moving substrate prior to the application of the adhesive at the location where the adhesive is to be applied in order to preheat the substrate. PCT publication WO 2012/130224 is concerned with applying a heat activated edge coating to a substrate and preheats a preformed band of an edge coating material with hot air to activate the adhesive and then presses the preheated and therefore activated material against the edge so that it bonds thereto and provides the final adhesive bond. The hot air is directed onto the surface of the edge coating material that is to be bonded to the edge. U.S. Pat. No. 4,222,812 describes a similar technique.

The present invention is however concerned with the direct application of heat flowable material onto a substrate with increased accuracy of deposition on sequential substrates, the invention ensures the use of the desired amount of material to provide material of reliably constant dimensions on each substrate with adequate adhesion to the substrate that allows the coated substrate to be stored and transported without damaging the coating or the bond between the coating and the substrate. In a preferred embodiment the heat flowable material is heat activatable at a temperature above the melt flow temperature at which it is extruded onto the substrate and in this embodiment the invention is concerned with providing good adhesion to the substrate but not to the provision of the final adhesive bond that is formed when the activated material is activated.

PCT publication WO 2012/104071 provides an improved mini-extruder whose internal arrangement is adapted to improve the uniformity of the extrudate. The present invention is particularly useful when used together with the extrusion systems described and illustrated in WO 2012/104071. The term mini-extruder is used herein to describe a robotic extruder capable of delivering small accurate and constant amounts of melt flowable material to a substrate in either continuous or intermittent fashion particularly to a series of substrates.

The invention therefore provides a process for the application of a heat flowable adhesive and/or sealant material to a substrate comprising extruding the heat flowable material from a die the external surface of which is at a distance from the surface of the substrate sufficient to ensure there is no interaction or impact between them wherein the extrusion die and the substrate are moved relative to each other to deposit the heat flowable material on the surface of the substrate and a gas at a temperature in the range 40° C. to 150° C. is blown at a pressure in the range 0.1 Mpa to 0.8 Mpa onto the side of the heat flowable material remote from the substrate.

The distance between the extrusion die and the surface of the substrate will depend upon the nature of the substrate and the thickness of the extrudate but it is preferably at least 0.5 mm to ensure that the die cannot touch the substrate. The gas should be inert in relation to the heat flowable material and is preferably air. The extrusion is preferably performed by a mini-extruder.

It is preferred that the hot gas blown onto the heat flowable material is blown onto the heat flowable material is at a temperature in the range 40° C. to 110° C. more preferably from 80° C. to 100° C., and contacts the extrudate as it leaves the die of the extruder and as it is deposited on the substrate. There is a gap between the nozzle of the extruder and the substrate to allow for tolerances in the dimensions of the substrate and regular deposition of the extrudate. The size of the gap will depend upon the nature and size of the extrudate. The invention is particularly concerned with thin extrudates having a thickness of from 0.2 mm to 1 cm particularly 0.3 mm to 0.6 mm more particularly about 0.4 mm. The gap should be large enough to avoid contact between the extruder, the substrate and will depend upon the nature and size of the extrudate. The combination of the temperature and pressure exerted by the hot gas on the heat flowable material has been found to enhance good adhesion of the material to the substrate and allow the formation of a precisely sized and shaped deposition of the material on the surface of the substrate. It also reduces the impact of variations in tolerances of the substrates which can result in some substrates being closer to the extrusion die than others which can result in undesirable different depositions on different substrates.

The melt flowable material may be a bead of adhesive and can be extruded with a mini-extruder, or prepared as a tape, a mini-extruder is preferred. When it is extruded it leaves from the nozzle of the extruder and is viscous, it is sufficiently molten to have tack so that it will bond on the surface of the substrate.

A hot gas jet directed on the extrudate towards the substrate applies a pressure on the extrudate and it is preferred that the gas is blown at a pressure of from 0.2 Mpa to 0.3 Mpa (2 to 3 bar). The temperature of the gas helps to maintain the tack power of the adhesive during the period from the exit from the nozzle and the bonding of the material to the substrate. The pressure applied on the extrudate is sufficient to press it on the substrate to create the contact and the adhesion with the substrate but is low enough that the extrudate is not undesirably deformed. This allows adjustment of an extrudate of adhesive with a precise location in the Z direction. For the location of the extrudate in the Y direction, an automation system can correct the position of the robot in relation to the substrate such as by sensing the position of the edge of the substrate. The extrudate may be a continuous or intermittent band of material or an array of material depending upon the nature and application of the substrate.

When a robotic system such as a robotic mini-extruder is used the automation system can include a captor for instance a laser captor which will adjust the position of the robot and the location of the die of the extruder. In a preferred embodiment the correction is applied directly to a mechanism of adjustment at the end of the robot arm. This correction can allow movement of the nozzles of the extrusion die in the Y direction (as shown in FIG. 1 hereto) by a few millimetres according to the position of the edge of the substrate.

In a preferred embodiment of this invention a flowing thermally activatable material is deposited on the substrate at a temperature below the activation temperature of the material. The material is fed to an extruder, the material is cooled within the initial zone of the barrel of the extruder, the material is heated to a temperature above the melting point and below the activation temperature of the material in a subsequent zone of the barrel of the extruder, and the molten material is extruded and the hot gas jet, at a temperature below the activation temperature of the material, is blown onto the extruding molten material pressing the molten material onto the substrate where it bonds to the substrate and cools to provide the required pattern of thermally activatable material on the substrate. It is preferred that the residence time of the material within the extruder is less than 10 minutes preferably less than 5 minutes. In a further preferment the material, once cooled on the substrate and adhering to the substrate, is non-tacky to the touch so enabling transport and storage of the substrate carrying the material without undesirable pick up of dust and dirt.

In addition as is described in WO 2012/104071 it is preferred that the compression ratio of the extruder which is the ratio of the channel depth at the end of the extruder divided by the channel depth in the initial feed zone should be kept low in order to minimise the shear forces on the material in the extruder. Excessive shear can create energy within the material in the extruder leading to sticking and premature activation of the material. A compression ratio in the range 1.5 to 2 is preferred. In a further preferred embodiment the length to diameter ratio of the extruder is 24 or lower, preferably between 24 and 16, more preferably between 20 and 16. This can reduce the residence time of the material within the extruder. It is also preferred that the extruder operates at between 10 and 50 revolutions of the extruder screw per minute.

The material is preferably cooled in the initial zone of the extruder and then heated preferably at a controlled rate in a subsequent zone of the extruder and also in the extrusion die. In a preferred embodiment the temperature is gradually increased in the heating zone such as by the provision of a plurality of heaters. The selection of temperatures in the various zones will depend upon the nature of the material. Cooling can be achieved by passing a cooling fluid, such as water, around the initial zone of the extruder and it is preferred that the temperature of the fluid as it leaves the cooling zone is no greater than 15° C. and preferably in the range 5° C. to 15° C. The optimum length of the cooling zone along the axis of the extruder will depend upon the nature of the material however, we prefer that the length is from two times to five times the diameter of the extruder barrel.

As the material passes from the initial cooling zone it is heated within the next zone of the barrel of the extruder to its melting temperature and again the temperatures that should be employed in the heating zone of the barrel of the extruder depends upon the nature of the material. The remainder of the barrel may be heated differentially so as to gradually bring the material to the desired extrusion temperature. Typical extrusion temperatures are in the range of 80° C. to 120° C. By way of example a first heating zone may be at a temperature in the range 20° C. to 40° C., a second heating zone may be at a temperature in the range 40° C. to 80° C. and a final heating zone may be at a temperature in the range 80° C. to 120° C. which can also be employed in the extrusion die. In a preferred system there are three separate heating zones along the barrel of the extruder and a separate heating system is provided for the nozzle and extrusion die.

Where the present invention involves the intermittent extrusion of materials the direction of rotation of the screw of the extruder can be reversible and is preferably reversed when it is desired to stop extrusion, this reversal helps to make a clean break in the extrudate and results in a well defined end of the extrudate on the substrate to which it has been applied. The reversal of the screw can be synchronised with the deposition of the extrudate on the substrate to ensure the desired pattern or array of the extrudate is produced. Where a discontinuous pattern is required the screw may be reversed and reactivated one or more times during the application to a single substrate. Alternatively a gate may be provided within the die of the extruder which can be closed to stop extrusion as is disclosed in German patent application DE 102008018881.

The drive for the extruder may be programmed to provide intermittent extrusion and application of the low melting thermoactivatable material, for example the extruder screw may be reversed to stop the feed of material to the extrusion die and, in certain instances, to suck back material thus making a clean break of the extrudate.

In a further embodiment when the extruder is to be used to apply a thin strip of material onto a substrate a small gap may be provided between the end of the screw of the extruder and the substrate and the extruder can be programmed so that the gap is filled immediately prior to the desired commencement of extrusion and the material can be sucked back into the gap when extrusion is to be terminated albeit temporarily. Alternatively extrusion can be stopped and restarted as appropriate.

The nature of the extrusion die will depend upon the desired form of the extrudate. However, for the preferred application of thin strips or bands of material a heated thin slot die is preferred. The die can be mounted at any angle and for certain applications it could be inclined at a downward angle relative to the barrel of the extruder. The die is preferably provided with a heating unit.

The extrusion die is preferably a single component with its own heating system. The nature of the die depends upon the desired shape of the extrudate but the invention is particularly useful for the extrusion of thin strips or bands of material.

The hot gas under pressure that is directed onto the surface of the extrudate remote from the substrates may be applied from jets located adjacent to the extrusion die or they may be integrated with the extrusion die. The preferred temperature of the hot gas will depend upon the nature of the material that is being extruded.

The invention is particularly useful in the extrusion of heat activatable materials. Heat activatable materials are materials that are activated by heat after they have been deposited on the substrate and at a higher temperature than the deposition temperature. For example they may foam and/or develop adhesive properties when heated to a temperature higher than that at which they are extruded and, like the extrusion temperature, the temperature of the hot gas should be lower than the activation temperature and/or the length of time to which the extrudate is subject to the hot gas should be such that no heat activation takes place. Examples of heat activation are foaming of the material and/or the development of adhesive properties for bonding that occurs, for example, during the automobile e-coat anticorrosion coating process. The hot air therefore improves the adhesion of the heat activatable material to the substrate and additionally controls and stabilises the size and shape of the extrudate on the substrate but does not cause heat activation of the material.

The techniques of the present invention may be used with any substrate however, it is particularly useful for the application of patterns or arrays of activatable material onto a substrate such as a component particularly a panel of an automobile. In order to provide the desired pattern or array of material the extruder may be moved in a predetermined manner relative to the surface of the substrate or alternatively, the substrate may be moved relative to the die of the extruder. The process may be robotically controlled and the robot can support and move the extruder while the substrate is static or the robot can move the substrate while the extruder is static.

The movement can be programmed to provide the desired pattern or array of the extrudate on the substrate which may be a line. The pattern or array on the substrate may be continuous or discontinuous and the extruder can be programmed to stop and start extruding more than one time on a single substrate. This can be useful if a combination of spot welding and a structural adhesive is to be used to bond substrates together and no adhesive is applied where the spot welds are to be formed, in each embodiment it is preferred that the material be extruded downwards onto the surface of the substrate.

Accordingly in a sequential operation a substrate may be placed on a holder beneath the extruder die, the extruder die may initially touch the substrate and then move away to provide the appropriate gap at which time extrusion coupled with the hot gas blowing is commenced and the substrate and/or the die moved relative to each other to provide the desired pattern or array of the extrudate on the substrate which may be continuous or discontinuous. Once the pattern or array is complete the extruder screw may be automatically reversed to stop extrusion and form a clean end of the pattern or array on the substrate. The substrate carrying the extrudate may be removed and replaced with the next substrate and the cycle repeated to form the deposit on the new substrate. This process may be automated and may be performed robotically and repeated until the desired number of components (coated substrates) have been produced. The process is particularly useful for the provision of thermo activatable adhesives on automobile components which can be activated to form bonds between components or to produce sealants during the automobile assembly process such as at temperatures experienced in paint bake or anticorrosion coat bake ovens.

In addition to the hot gas blowing onto the extrudate the substrate itself may be pre-treated such as by heating, infra red or plasma treatment to further improve the adhesion of the extrudate to the substrate.

The extrusion techniques of the present invention may be used for the extrusion of any materials. They are however particularly useful for the extrusion of thermally activatable material at temperatures below that at which they are activated, in particularly thermohardenable epoxy based adhesive systems. Examples of thermal activation may be foaming, crosslinking or curing or a combination of the two. Where a material is to foam under the action of heat it will typically contain a blowing agent which generates the gas required to cause foaming at an activation temperature.

The techniques of the present invention may be used to extrude the material and press it onto the substrate at a temperature at which it will adhere to the substrate but which is below that at which the blowing agent is activated. Similarly if the material is thermohardenable and hardening is caused by the activation of a curing agent within the material formulation the techniques can be used to extrude the material at a temperature at which it will adhere to a substrate but which is below that at which the curing agent is activated. The techniques can be used in a similar manner with a material that both foams and cures at elevated temperature.

The invention is therefore particularly useful for the provisions of a pattern or array of a thermoactivatable material on a substrate for subsequent activation. Examples of such use include the provision of structural adhesives on automobile components such as doors or body and roof panels and at locations where hem flanges are to be produced. The structural adhesives may contain crosslinking agents which are activated by heat and they may be foamable according to the use to which they are to be put. Another example is where it is desirable to create a foam such as an acoustic baffle or a sealant. In this instance the desired pattern or array of the foamable material can be applied in an unfoamed state ready for foaming during the subsequent automotive assembly operation. The techniques are equally useful in other industries such as aircraft, railroad vehicles, furniture and the construction industry.

The heat flowable materials being applied according to the present invention may be adhesive materials, sealant materials, expandable materials, structural materials, weldable materials, weld-through materials, paintable materials or other suitable flowable materials in one highly preferred embodiment, the heat flowable materials may be treated or otherwise processed for the application of additional materials which facilitate and allow the formation of a class A painted surface finish, or other class of painted or treated surface, upon the flowable material. In other embodiments, the heat flowable materials may be electrically conductive, insulative, magnetic, transparent or possess another advantageous property along some or all of its length.

Preferably, the heat flowable materials are applied as one or more blends in a first physical state (e.g., unfoamed, having a particular sectional profile, uncured, or otherwise) and are thereafter exposed to a stimulus such as heat, a chemical or another suitable stimulus to induce or activate the flowable materials to transform (reversibly or irreversibly) to a second physical state (e.g., foamed, to a different sectional profile, cured or otherwise). The heat flowable materials may upon activation exhibit various desirable properties such as sound absorption, vibration absorption, corrosion resistance, adhesivity, sealing properties, strength, stiffness and the like which may enhance respective properties of components that receive the materials. Alternatively, the heat flowable materials when applied, produce a combination with the underlying component that is enhanced in one or more relevant properties.

According to one embodiment of the invention, the flowable materials may be heat activatable. A preferred heat activatable material is an expandable polymeric formulation or composition, that is activated to foam, flow or otherwise change states when exposed to the heating operation of a typical automotive painting operation such as during a primer or paint drying step. One preferred material is formed of an olefinic polymer-based foam, and more particularly an ethylene based polymer. For example, the polymeric foam may be based on ethylene copolymers or terpolymers. Examples of particularly preferred polymers include ethylene vinyl acetate copolymers, elastomers such as EPDM, or a mixture thereof. Examples of preferred foamable heat flowable materials include materials evadable from L&L Products, Europe, under the designations as L-2105, L-2100, L-7005 or L-2018, L-7100, L-7101, L-7102, L-7108. L-7101, L-7110, L-7700, L-2410, L-2411, L-2412, L-4201, L-4141, L-2806, L-2810, L-4161, L-2820. Such materials may exhibit properties including sound absorption, vibration absorption, sealing ability, corrosion resistance and the like.

Alternatively the heat flowable material may be a heat-activatable epoxy-based resin having foamable characteristics upon activation through the use of heat typically encountered in an e-coat or other automotive paint oven operation. As the expandable material is heated, it expands, cross-links, and structurally bonds to adjacent surfaces. An example of a preferred formulation is an epoxy-based material that may include polymer modifiers such as an ethylene copolymer or terpolymer that is commercially available from L&L Products, Europe, under the designations that include L-5204, L-5206, L-5207, L-5208, L-5222, L-5235, L-5236, L-5244, L-5505, L-5510, L-5520, L-5540, L5573, XP-5254, XP-5800. Such materials may exhibit properties including relatively high strength and stiffness, they can promote adhesion, rigidity, and impart other valuable physical and chemical characteristics and properties.

When acoustical damping properties are desired, it is contemplated that the present invention may utilize a foamable material formulated to assist in the reduction of vibration and noise after activation. In this regard, reinforced and vibrationally damped components can have increased stiffness which will reduce natural frequencies, that resonate through the automotive chassis thereby reducing transmission, blocking or absorbing noise through the use of the acoustic product. By increasing the stiffness and rigidity of the components of a vehicle, the amplitude and frequency of the overall noise, vibration or both that occurs from the operation of the vehicle and is transmitted through the vehicle can be reduced.

Other melt flowable materials with which the invention may be used include, phenol/formaldehyde materials, phenoxy materials, and polyurethanes.

In applications where a heat activatable, thermally expanding material is employed, a consideration involved with the selection and formulation of the material is the temperature at which activation such as expansion, and possibly curing of the material, will take place. For instance, the material should not be activatable at room temperature or otherwise at the ambient temperature in a production line environment since, in one embodiment, the material is extruded onto the substrate by a supplier and then shipped to the vehicle manufacturer as an integrated product. In a preferred embodiment the melt flowable material is activated at higher processing temperatures, such as those encountered in an automobile assembly plant, when the material is processed along with the vehicle components at elevated temperatures or at higher applied energy levels, e.g., during e-coat preparation steps and other paint cycles. While temperatures encountered in an automobile e-coat operation may be in the range of about 145° C. to about 210° C. (about 300° F. to 400° F.), primer, filler and paint shop applications are commonly about 100° C. (about 200° F.) or higher. The material is thus activated within these ranges. If needed, blowing agent activators can be incorporated into the composition to cause expansion at the required temperatures.

Generally, suitable expandable flowable materials have a range of volumetric expansion from 50 to over 2000 percent depending upon the function required of the foam. Structural rigid foams may have a degree of expansion from 50 to 200 percent. The level of expansion of acoustic barrier or vibration reduction material may be as high as 1500 percent or more. In certain embodiments, the material may be hyper-expandable materials that expand more than 1500 percent and preferably over about 2000 percent.

As discussed particularly for automotive operations, it is generally desirable for flowable materials of the present invention to activate and flow at temperatures experienced during automobile paint cycles. Prior to activation, however, it is often preferable for the flowable materials to be exhibit solid and substantially non-tacky characteristics at temperatures near room temperature (e.g., between about 5° C. and about 50° C.), while exhibiting characteristics of slight flow and tackiness without activation at mid-level temperatures (e.g., between about 50° C. and about 120° C.) so that the materials can be heated to mid-level temperatures to allow the materials to flow and adhere to a substrate.

For forming melt flowable material that exhibits such desired characteristics, a base resin with a narrow molecular weight distribution is preferably included in the material formulation. The molecular weight distribution is preferably such that 70% of the polymers in the base resin are within 10,000 atomic mass units (amu) of each other, more preferably 80 percent of the polymers in the base resin are with 5000 amu of each other and even more preferably 90 percent of the polymers are within 1000 amu of each other. Preferably, the base resin comprises about 50 to about 100 wt % of the material or of the polymeric constituents of the material and more preferably about 60 to about 90 wt % of the material or of the polymeric constituents of the material.

It is also contemplated that the melt flowable materials may be formulated with one or more components, which assist in adhering the materials to a substrate upon application thereto. Typically, such components are added to achieve desirable interaction between the flowable materials and contaminants (e.g., oil and lubricants), which may be present upon a surface of a substrate to which the flowable material may be applied.

In one embodiment, the melt flowable material includes one or more solubilizing agents, which assist the melt flowable material in solubilizing contaminants on a substrate surface. Examples of such solubilizing agents include hydrocarbons (e.g., hydrocarbon process oils), phthalate plasticizers, liquid polyolefins or the like. Preferably, when used such solubilizing agents are between about 1 and about 30 wt % of the flowable material, more preferably between about 5 and about 20 wt % of the flowable material.

In another embodiment, the melt flowable material includes one or more polar components, which can aid in adhesion of the flowable material to the substrate. Preferably, such components have relatively low melting points (e.g., between about 50° C. and about 100° C.). Examples of such components include oxidized or otherwise functionalized waxes, petroleum resins, resin esters, epoxy resins or combinations thereof. Preferably, when used, such polar components are about 1 and about 30 wt % of the flowable material, more preferably between about 2 and about 15 wt % of the flowable material.

In still another embodiment, the flowable material includes one or more components such as waxes that are modified with an adhesion promoter such as an acid anhydride group. Preferably, when used, such modified components are about 1 and about 30 wt % of the flowable material, more preferably between about 5 and about 20 wt % of the flowable material.

The invention therefore enables improved control of the temperature of the extruded material and the production of a uniform extrudate well bonded to the substrate over an extended period of time without the need for stoppages.

In a shared embodiment the invention therefore allows the robotic production of a series of automobile components provided with a band or pattern of heat activatable material that is accurately located on the component and sufficiently well bonded to the component that it can be produced in one location and transported to another location for assembly within the automobile where the material is subsequently heat activated.

The invention is illustrated by reference to the accompanying drawings in which

Figure 1:
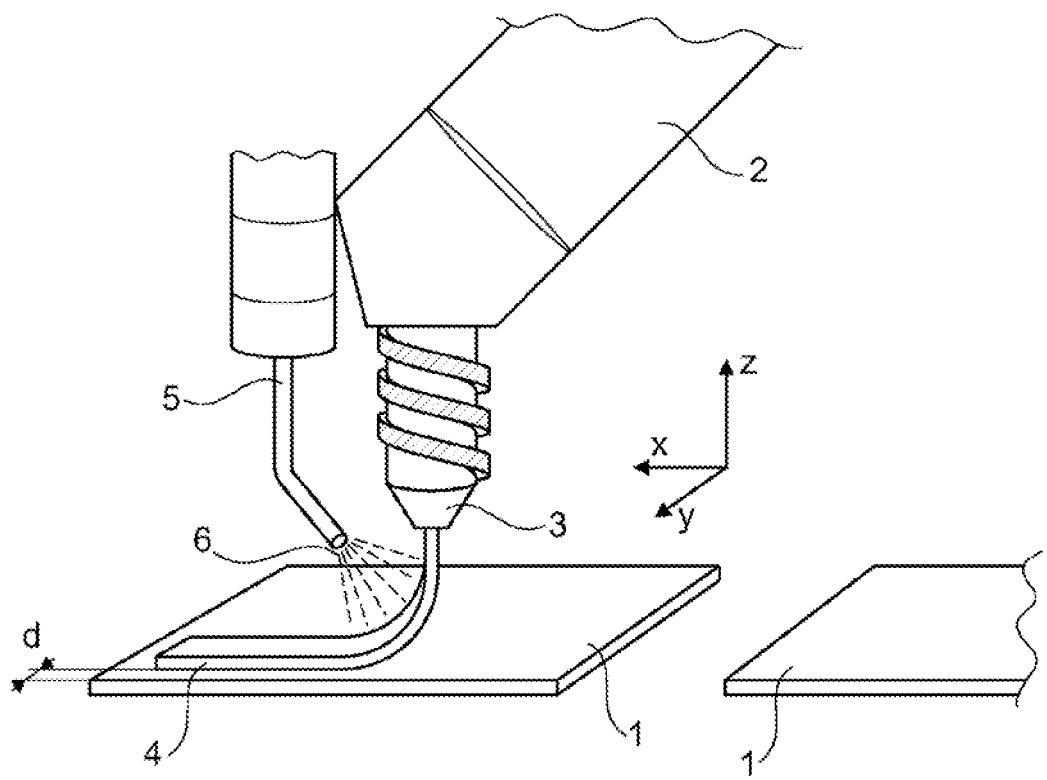
FIG. 1 shows an extrusion system according to the present invention.
Figure 2:
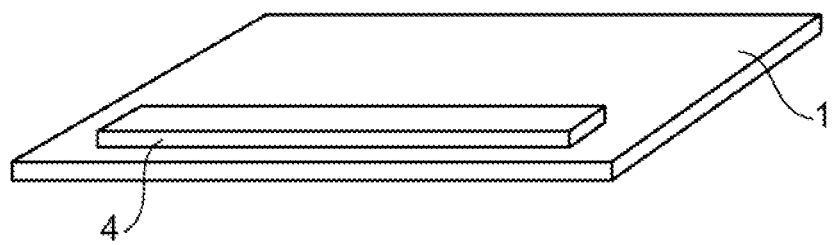
FIG. 2 shows a substrate provided with an extruded strip by the process of the present invention.

FIG. 1 shows a series of substrates (1) which are moving from right to left in the figure. The substrates move so that they are sequentially positioned below the nozzle (3) of the mini extruder (2) from which a strip of material (4) is extruded. Hot air (6) is blown onto the extrudate (4) from the hot air blower (5). The material (4) is of width (d) and is held by the hot air (6) at the temperature required for it to adhere to the substrate (1) to produce a thin strip of the extrudate (4) in the substrate (1) as shown in FIG. 2.

FIG. 1 also illustrates the X, Y and Z directions referred to in this application.

The invention claimed is:

1. A process for application of a heat flowable adhesive material to a substrate comprising:
a) extruding the heat flowable adhesive material from an extrusion die of an extruder;
   wherein the extrusion die and the substrate are moved relative to each other to deposit the heat flowable adhesive material on a surface of the substrate;
   wherein the heat flowable adhesive material has a thickness of about 0.2 mm or greater and about 0.6 mm or less;
b) blowing a gas at a temperature in a range of 40° C. to 150° C. at a pressure in a range of 1 to 8 bars (0.1 Mpa to 0.8 Mpa) onto a side of the heat flowable adhesive material remote from the substrate and between the extrusion die and the substrate to retain adhesive properties between the heat flowable adhesive material and the substrate;
   wherein the distance between the extrusion die of the extruder and the surface of the substrate is from 0.5 mm to 2 cm to prevent interaction between them; and
   wherein a direction of rotation of a screw of the extruder is reversible to stop extrusion.

2. The process according to claim 1, wherein the gas is blown at a temperature in the range of 40° C. to 110° C.

3. The process according to claim 1, wherein the gas is blown at a pressure of 0.2 to 0.3 Mpa.

4. The process according to claim 1, wherein the gas is blown onto the heat flowable adhesive material as it leaves the extrusion die of the extruder and as it is deposited on the substrate.

5. The process according to claim 1, wherein the gas is air.

6. The process according to claim 1, wherein the extruder is a robotic mini-extruder.

7. The process according to claim 1, wherein the heat flowable adhesive material is a thermally activatable material and is deposited on the substrate at a temperature below an activation temperature of the material.

8. The process according to claim 1, wherein the heat flowable adhesive material is extruded at a temperature in the range of 60° C. to 120° C.

9. The process according to claim 1, wherein the extruding is intermittent.

10. The process according to claim 1, wherein the gas is applied from jets located adjacent to the extrusion die that are integrated with the extrusion die.

11. The process according to claim 1, wherein the heat flowable adhesive material is applied to a series of substrates that are sequentially located adjacent to the extrusion die of the extruder.

12. The process according to claim 1, wherein a residence time of the heat flowable adhesive material within the extruder is less than 10 minutes.

13. The process according to claim 1, wherein the heat flowable adhesive material is an expandable material.

14. An apparatus for application of a heat flowable adhesive material to a series of substrates comprising:
- an extruder for extruding the heat flowable adhesive material from a die, wherein the heat flowable adhesive material has a thickness of about 0.2 mm or greater and about 0.6 mm or less, wherein a residence time of the heat flowable adhesive material within the extruder is less than 10 minutes, and wherein a direction of rotation of a screw of the extruder is reversible to stop extrusion;
- a line for provision of a series of substrates to a location which is between 0.5 mm and 2 cm from the die to the series of substrates;
- means for moving the die and the series of substrates relative to each other to deposit the heat flowable adhesive material on a surface of the series of substrates; and
- one or more gas jets to blow gas at a temperature in a range of 40° C. to 150° C. and at a pressure in a range of 0.1 Mpa to 0.8 Mpa onto a side of the heat flowable adhesive material remote from the series of substrates and between the extruder and the substrates.

15. The apparatus according to claim 14, wherein the gas is blown at a temperature in the range of 40° C. to 110° C.

16. The apparatus according to claim 14, wherein the gas is blown at a pressure of 0.2 Mpa to 0.3 Mpa.

17. The apparatus according to claim 14, wherein the one or more gas jets is positioned to blow the gas onto the heat flowable adhesive material as it leaves the die of the extruder and as it is deposited on the series of substrates.

18. The apparatus according to any of claim 14, wherein the extruder is a robotic mini-extruder.

19. The apparatus according to claim 14, wherein the residence time of the heat flowable adhesive material within the extruder is less than 5 minutes.

20. The apparatus according to claim 14, wherein the heat flowable adhesive material is an expandable material.

* * * * *